US010962380B2

(12) United States Patent
Sood et al.

(10) Patent No.: US 10,962,380 B2
(45) Date of Patent: Mar. 30, 2021

(54) ANALYSIS OF NETWORK EFFECTS OF AVOIDANCE AREAS ON ROUTING

(71) Applicant: GM Cruise Holdings LLC, San Francisco, CA (US)

(72) Inventors: Anav Sood, Stanford, CA (US); Mason Swofford, Fishers, IN (US); Lucio Otavio Marchioro Rech, San Mateo, CA (US); Alex Bowe, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 223 days.

(21) Appl. No.: 16/227,523

(22) Filed: Dec. 20, 2018

(65) Prior Publication Data

US 2020/0200552 A1    Jun. 25, 2020

(51) Int. Cl.
*G01C 21/34* (2006.01)
*G05D 1/00* (2006.01)

(52) U.S. Cl.
CPC ..... *G01C 21/3461* (2013.01); *G01C 21/3415* (2013.01); *G05D 1/0088* (2013.01); *G05D 2201/0213* (2013.01)

(58) Field of Classification Search
CPC ............ G01C 21/3461; G01C 21/3415; G05D 2201/0213; G05D 1/0088
See application file for complete search history.

(56) References Cited

U.S. PATENT DOCUMENTS

| | | | |
|---|---|---|---|
| 9,587,952 B1 | 3/2017 | Slusar | |
| 9,688,288 B1 * | 6/2017 | Lathrop | B60W 50/14 |
| 9,784,589 B1 | 10/2017 | Gyenes et al. | |
| 9,851,212 B2 | 12/2017 | Stephens et al. | |
| 10,126,136 B2 | 11/2018 | Iagnemma | |
| 10,156,848 B1 | 12/2018 | Konrardy et al. | |
| 10,775,184 B2 * | 9/2020 | Ho | G06Q 10/063 |
| 2015/0285652 A1 * | 10/2015 | Peri | G01C 21/3476 |
| | | | 701/438 |
| 2016/0275404 A1 * | 9/2016 | Abraham | G06Q 10/20 |
| 2017/0315551 A1 * | 11/2017 | Mimura | B62D 15/025 |
| 2018/0045525 A1 * | 2/2018 | Ara jo | G01C 21/3469 |
| 2018/0203455 A1 * | 7/2018 | Cronin | B60W 50/14 |
| 2018/0252539 A1 * | 9/2018 | Yunoki | G08G 1/167 |
| 2019/0120640 A1 * | 4/2019 | Ho | G06Q 50/30 |
| 2019/0128688 A1 * | 5/2019 | Choi | G01C 21/3492 |
| 2019/0311453 A1 * | 10/2019 | Schneider | G06Q 10/06315 |

* cited by examiner

*Primary Examiner* — Genna M Mott
(74) *Attorney, Agent, or Firm* — Medley, Behrens & Lewis, LLC

(57) ABSTRACT

A computing system that analyzes the network effects of avoidance areas on autonomous vehicle routing is described herein. The computing system includes a data store that comprises a set of avoidance areas through which the autonomous vehicle is prohibited from being routed. A routing system generates an initial route from a source location to a target location irrespective of avoidance areas included on the initial route. When a number of avoidance areas on the initial route exceed a predetermined threshold, one or more alternative routes are generated from the source location to the target location that respectively circumvent a corresponding identified avoidance area on the initial route. Metrics are evaluated for the one or more alternative routes and a subset of avoidance areas are outputted to desirably be removed from the set of avoidance areas.

20 Claims, 9 Drawing Sheets

ANALYSIS OF NETWORK EFFECTS OF AVOIDANCE AREAS ON ROUTING

BACKGROUND

An autonomous vehicle is a motorized vehicle that can navigate from a first location to a second location without a human driver. For example, the autonomous vehicle may include a routing system that generates a travel route based upon information obtained from a high definition (HD) map. A localization system of the autonomous vehicle further relies upon the HD map to determine where the autonomous vehicle is located, in three-dimensional space, so that the travel route generated by the routing system can be executed. Such maps are typically created from lidar data and image data collected from navigating multiple vehicles/multiple times along a same roadway and aggregating the data. The more data that is collected for the HD map, the more precise the map may become.

While HD maps can provide an accurate representation of a given environment, certain aspects of the environment do not always remain static. For instance, repainted road lines, new traffic lights, newly installed signage, and other modifiable features such as crosswalks and road geometry can compromise the integrity of an HD map and, by extension, the ability of an autonomous vehicle to navigate safely about the roadways. Thus, when inconsistencies with the HD map are detected in an environment, a geographic area including the inconsistency may be flagged on the HD map as an avoidance area through which the autonomous vehicle is prohibited from being routed.

Problematically for large scale mapping operations (e.g., maps created for an entire city) is that the rate at which avoidance areas are established may occur faster than the rate at which the avoidance areas can be remapped from newly collected lidar data and image data. When enough avoidance areas are specified on the HD map, the routing system may generate a route, for example, that is longer than an optimal length (e.g., twice the optical length, etc.), requires more costly fares, and/or includes navigational inconveniences that could otherwise be averted by a human driver. Since not all avoidance areas have the same network effects on autonomous vehicle routing, determining a particular order to remap the avoidance areas is oftentimes more beneficial than selecting avoidance areas at random to remap. Unfortunately, statistical approaches for prioritizing the order in which avoidance areas should be remapped are computationally cumbersome and are typically impractical to implement in large scale mapping operations.

SUMMARY

The following is a brief summary of subject matter that is described in greater detail herein. This summary is not intended to be limiting as to the scope of the claims.

Described herein are various technologies pertaining to analysis of network effects of avoidance areas on routing. With more specificity, described herein is a computing system that identifies one or more avoidance areas to remove from a set of avoidance areas specified on a map based upon remapping the one or more avoidance areas in an order that desirably improves the network effects on autonomous vehicle routing. Network effects refers to the collective impact that the one or more avoidance areas have on an efficiency of a given route generated from a source location to a target location.

With still more specificity, described herein is a computing system that includes a data store comprising a set of avoidance areas, wherein the computing system generates an initial route from a source location to a target location and detects one or more identified avoidance areas from the set of avoidance areas on the initial route. When a number of the identified avoidance areas on the initial route exceeds a predetermined threshold, one or more alternative routes can be generated from the source location to the target location that respectively circumvent a corresponding identified avoidance area included in the identified avoidance areas on the initial route. Moreover, metrics for the alternatively routes can be evaluated. Further, a subset of the avoidance areas from the set of avoidance areas to desirably be removed from the set of avoidance areas on the initial route and/or one or more of the alternative routes can be outputted based upon values of the metrics.

An exemplary computing system can be configured to identify avoidance areas on a map that have a disproportionate impact on routing metrics, such as length of route, cost of route, estimated time of arrival, etc., so that resources needed to remap/resolve such avoidance areas can be prioritized accordingly. In other words, the computing system can identify a threshold number of avoidance areas (N) or less that, if remapped, would provide an improvement in the efficiency of a generated route from the source location to the target location as compared to a route that is generated from the source location to the target location without remapping the avoidance areas. Additionally, an order for which the avoidance areas are remapped can be prioritized based upon segments of roadways that are in high demand when aggregated over a plurality of trips/routes, rather than trip-specific selection of avoidance areas.

The routing system is configured to generate a route (e.g., an initial route or one or more alternative routes) based upon the set of avoidance areas included in the data store. An avoidance area specifies a geographic area through which autonomous vehicles are prohibited from being routed. Avoidance areas can be either blacklisted or greylisted by the computing system based upon the complexity of the feature that produced the avoidance area. Further, each avoidance area can be divided into subtypes including addressable avoidance areas (e.g., areas that need further data collection, cause incorrect vehicle maneuvers, include new or uncommon features, cause localization or mapping errors, are prone to heavy traffic, require further verification, etc.) and non-addressable avoidance areas (e.g., areas that include narrow or reversable lanes, long-term construction, complex intersections such as roundabouts, combined lights and signage, railways, etc.). Non-addressable avoidance areas specify a geographic area that cannot be desirably removed from the set of avoidance areas, almost as if the portion of the roadway including the non-addressable avoidance area is impassable or does not exist. Thus, reference to an avoidance area herein generally refers to an addressable avoidance area, unless otherwise specified as a non-addressable avoidance area. Further, since there is no need for an avoidance areas analysis system to analyze routes that pass through a non-addressable avoidance area, the routing system can be prohibited from generating routes that pass through the non-addressable avoidance areas.

In order to reduce the number of avoidance areas that are specified on a map, at least one of the avoidance areas in the set of avoidance areas in the data store can be specified by grouping a plurality of avoidances having a same type and subtype into a common avoidance area group that is recognized by the avoidance area analysis system as a single avoidance area. Such avoidance areas can typically be based upon a same root cause, situated close to each other, and often can include similar timestamps (e.g., minimal or no additional effort may be needed to resolve avoidance areas in the group compared to resolving just one of the avoidance areas in such group).

For any given route from a source location to a target location, the routing system is configured to effectively ignore addressable avoidance areas on the map to generate an ideal/initial route. One or more identified avoidance areas that the ideal/initial route passes through are then detected by the computing system. When the number of the one or more identified avoidance areas on the initial route is less than or equal to a predetermined threshold (e.g., N≤3), the one or more identified avoidance areas on the initial route can be outputted to desirably be removed from the set of avoidance areas to improve the efficiency of route generation. Otherwise the routing system is configured to again effectively ignore addressable avoidance areas on the map to generate one or more alternative routes from the source location to the target location.

When one or more identified avoidance areas are detected from the set of the avoidance areas on the initial route and on each of the one or more alternative routes that exceed the predetermined threshold (e.g., N≤3), one or more recursive routes can be generated. A recursive route is a route that is generated by respectively circumventing a corresponding identified avoidance area (e.g., as if the corresponding identified avoidance area were temporarily non-addressable) included in the one or more identified avoidance areas on the one or more alternative routes and can itself be considered an alternative route from the source location to the target location. Accordingly, generation of the one or more recursive/alternative routes may be based upon a recursive depth parameter that limits a level of recursive branch routes generated off of the one or more alternative routes. The one or more alternative routes can also be generated based upon a predefined processing time constraint which specifies a timeframe for generating the one or more alternative routes.

Upon evaluation of metrics for the one or more recursive routes, a subset of the avoidance areas from the set of avoidance areas can be outputted based upon the metrics to desirably be removed from the set of avoidance areas on one or more of the initial route or the one or more recursive/alternative routes to improve the efficiency of routing from the source location to the target location. The metrics used to evaluate the one or more alternative routes can include a heuristic such as cost of routes, walking distance to the vehicle, etc. Further, the computing system can eliminate recursive or alternative routes when a more efficient route has already been identified based upon removal of N or less avoidance areas. That is, the avoidance areas in the subset that, when removed from the set of avoidance areas provide a less desirable value of a metric than the value of the metric provided by removal of other avoidance areas in the subset, can be identified by the computing system (e.g., those disposed along other alternative or recursive routes). Less desirable values of a metric include longer route distances, more expensive fare costs, longer travel times, etc. Avoidance areas in the subset that provide the less desirable value of the metric are then excluded from the output to provide the other identified avoidance areas having the more desirable value of the metric.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
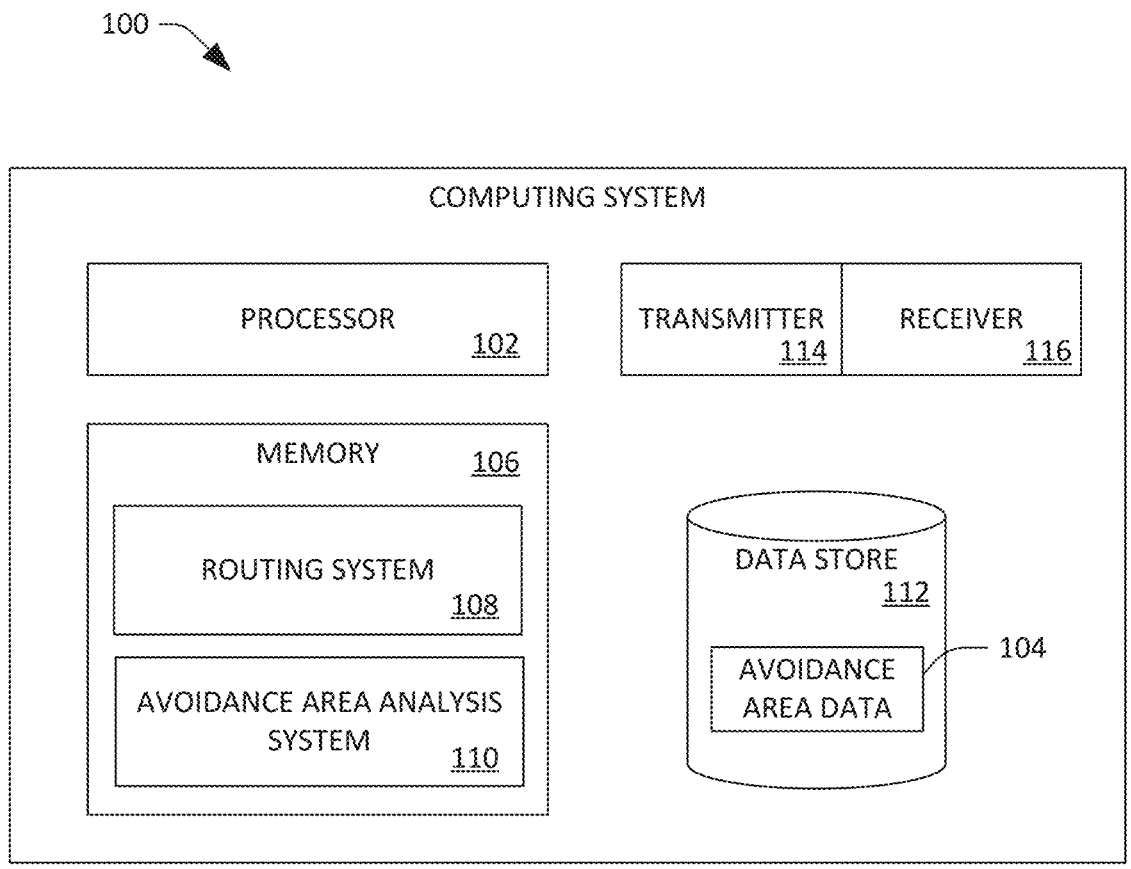
FIG. 1 illustrates an exemplary computing system that generates routes for autonomous vehicles and analyzes the network effects of avoidance areas on the generated routes.

Various technologies pertaining to analysis of network effects of avoidance areas on routing is now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Further, as used herein, an "initial route" is a route that is generated from a source location to a target location irrespective of avoidance areas. An "alternative route" is a route that circumvents at least one avoidance area located on an initial route. A "recursive route" is a route that circumvents at least one avoidance area that is not located on an initial route but is located on an alternative route or other route of a preceding lower level of recursion.

Further, as used herein, the term "exemplary" is intended to mean serving as an illustration or example of something and is not intended to indicate a preference.

With reference now to FIG. 1, an exemplary computing system 100 configured to generate routes for an autonomous vehicle and analyze the network effects of avoidance areas on the generated routes is illustrated. The computing system 100 comprises a processor 102 and memory 106 that stores computer-executable instructions that are executed by the processor 102 to cause the processor 102 to perform acts in accordance therewith.

Memory 106 can include a routing system 108 and an avoidance area analysis system 110. The routing system 108 can generate one or more routes from a source location to a target location based upon metrics such as minimizing a length, cost, and/or travel time of a route. The generated route may pass through one or more addressable avoidance areas. However, the routing system 108 typically generates routes that circumvent non-addressable avoidance areas. In an exemplary embodiment, the one or more routes are generated based upon a predefined processing time constraint which specifies a timeframe for the processor 102 to generate the one or more routes.

The avoidance area analysis system 110 can generate an output that identifies a subset of avoidance areas which, if removed from a generated route, would provide a route having an improved value of a metric over a route configured to avoid the set of avoidance areas, wherein the subset of avoidance areas are left unremoved from the set of avoidance areas. The output of the computing system is generally trip specific (e.g., evaluating avoidance areas on routes from point A to point B). However, the order in which avoidance areas are identified for remapping can also be prioritized based upon segments of roadways that are in high demand when aggregated over a plurality of trips/routes. In either case, the avoidance area analysis system 110 can exclude outputs that include avoidance areas in the subset that provide a less desirable value of the metric than a value of the metric that has already been identified by removal of other avoidance areas in the subset.

A transmitter 114 and a receiver 116, which may be configured as a single transceiver, is disposed in the exemplary computing system 100 to establish communication with other devices. For example, the receiver 116 may receive lidar data and camera data that include new or updated avoidance area data 104 collected from continued mapping operation. The avoidance area data 104 can be stored in a data store 112 that accumulates collected data to define a set of avoidance areas that comprises the identified avoidance areas incorporated in the map. The routing system 108 and the avoidance area analysis system 110 generate routes (e.g., an initial route or one or more alternative routes) and analyze the network effects thereof based upon the avoidance area data 104 included in the data store 112. The transmitter 114 is configured to transmit information, such as output avoidance areas to desirably be removed from a set of avoidance areas included in the data store 112, to other devices and/or sources configured to collect information for resolving avoidance areas on the map.

Figure 2:
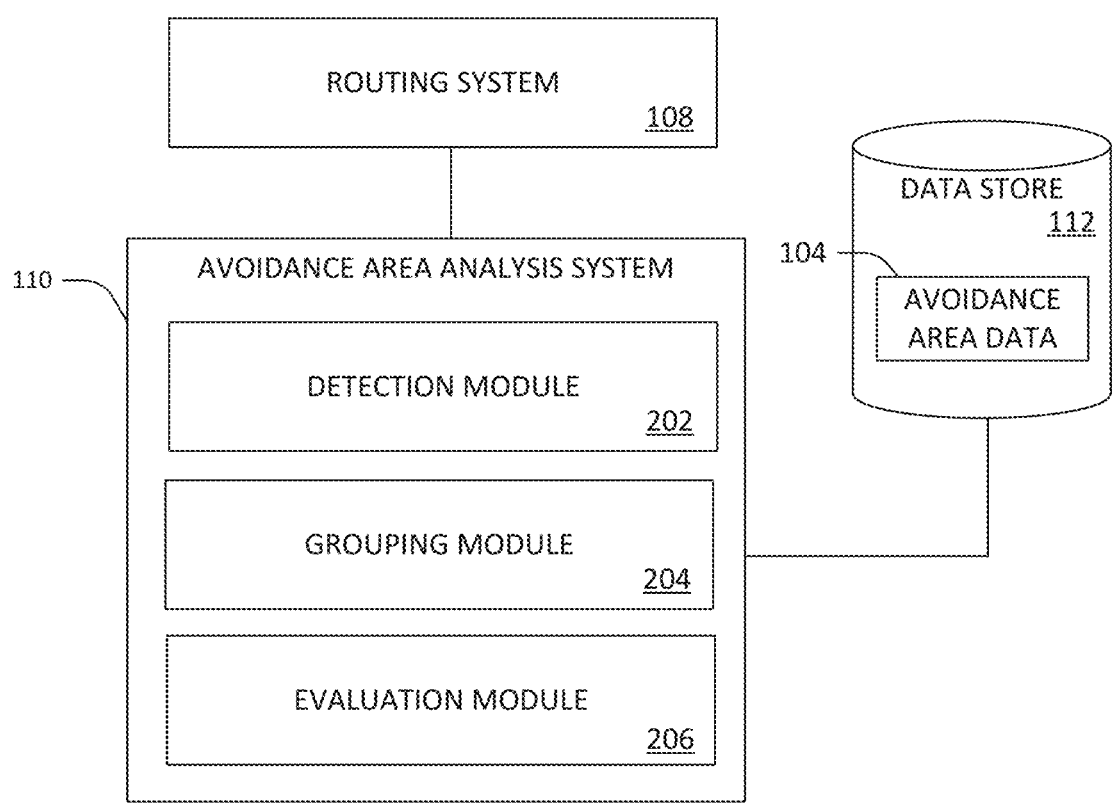
FIG. 2 illustrates an exemplary avoidance area analysis system.

With reference now to FIG. 2, the avoidance area analysis system 110 can include a detection module 202, a grouping module 204, and an evaluation module 206. The detection module 202 is configured to detect one or more identified avoidance areas from a set of avoidance areas located on an initial route generated by the routing system 108 utilizing the avoidance area data 104 retained in the data store 112. When the detection module 202 detects that a number of the one or more identified avoidance areas on the initial route exceeds a predetermined threshold (e.g., 4 or more avoidance areas), the detection module 202 prompts the routing system 108 to generate one or more alternative routes that respectively circumvent a corresponding identified avoidance area included in the one or more identified avoidance areas on the initial route.

An avoidance area detected by the detection module 202 may comprise a plurality of avoidances. An avoidance is a single inconsistency that is detected by the detection module 202 with respect to currently retained map data and is identified based upon an input to the data store 112 from a sensor signal that captures an environment. The grouping module 204 identifies each avoidance detected by the detection module 202 and is configured to group similar avoidances into a common group to define an avoidance area included in the set of avoidance areas. Avoidances that are grouped into an avoidance area by the grouping module 204 are oftentimes based upon a same root cause, situated close to each other, or include similar timestamps (e.g., corresponding to times at which the avoidances were detected), wherein minimal or no additional effort is required to remap/resolve all of the avoidances in the group as opposed to remapping/resolving just one of the avoidances.

The grouping module 204 generally groups a plurality of avoidances that have a same type and subtype into a common avoidance area group. The type of the avoidance area corresponds to whether the avoidance area is blacklisted or greylisted and the subtype of the avoidance area refers to whether the blacklisted or greylisted avoidance area is addressable or non-addressable. Non-addressable avoidance areas included in the data store 112 specify a geographic area through which generation of the initial route and the one or more alternative routes is prohibited, whereas addressable avoidance areas included in the data store 112 specify a geographic area through which routing of autonomous vehicles is prohibited.

The evaluation module 206 evaluates metrics for a route based upon removal of an avoidance area (e.g., a common avoidance group) from the set of avoidance areas to determine which avoidance areas have a disproportionate impact on the efficiency of a generated route by the routing system 108. The metrics used to evaluate a route, such as an initial route or one or more alternative routes, can include a heuristic such as cost of routes, walking distance to the vehicle, etc. When the evaluation module 206 determines that the number of the one or more identified avoidance areas on the initial route is less than or equal to the predetermined threshold, the evaluation module 206 outputs the one or more identified avoidance areas on the initial route to desirably be removed from the set of avoidance areas. When the evaluation module 206 determines that the number of the one or more identified avoidance areas on the initial route exceeds the predetermined threshold, the evaluation module 206 outputs a subset of avoidance areas on the one or more alternative routes to desirably be removed from the set of avoidance areas.

Figure 3:
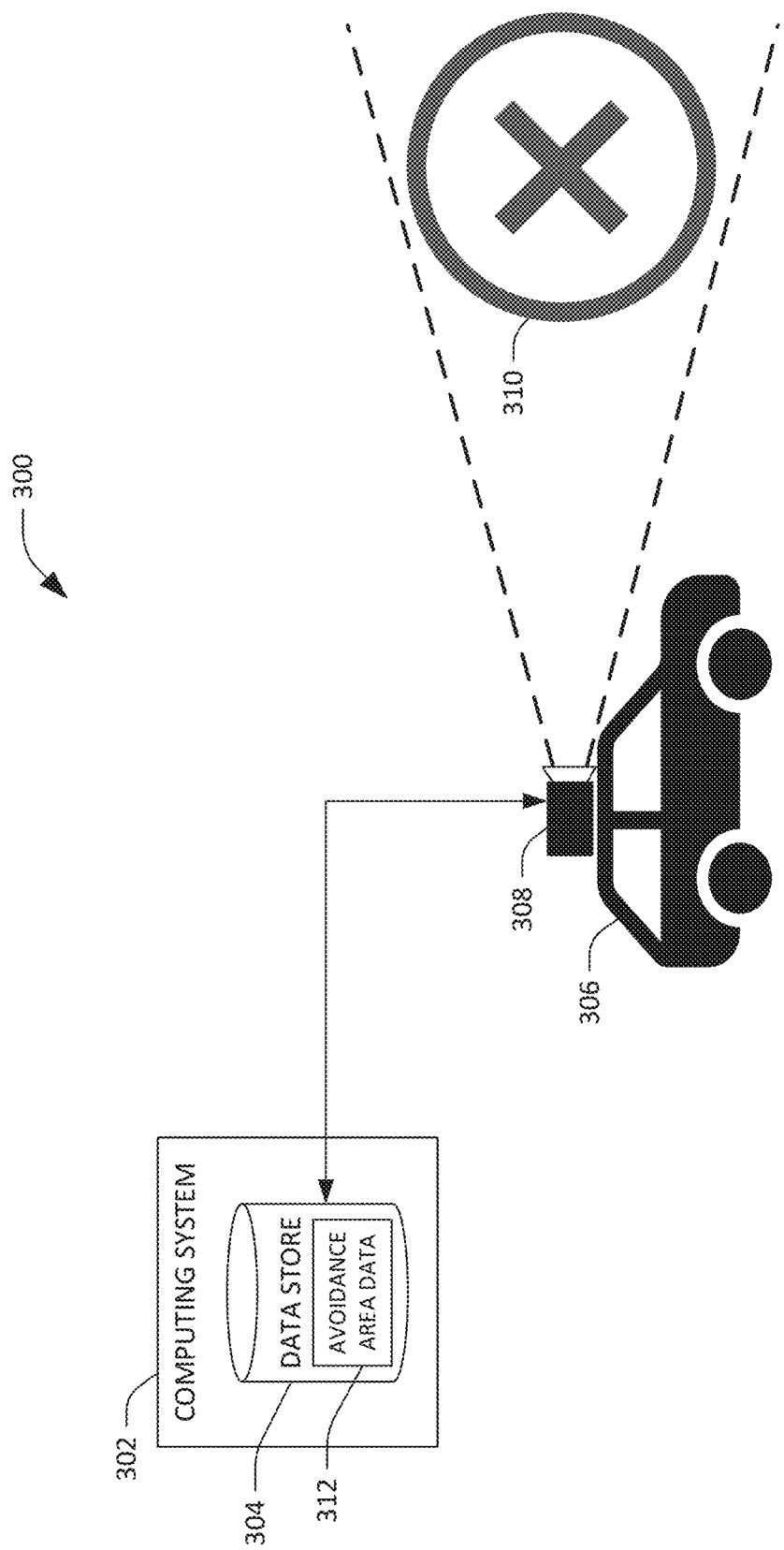
FIG. 3 illustrates an exemplary data store configured to receive avoidance area data from an autonomous vehicle.

With reference now to FIG. 3, an exemplary environment 300 is illustrated that includes an autonomous vehicle 306 in communication with a computing system 302. The autonomous vehicle 306 includes a sensor system 308 such as a camera sensor system or a lidar sensor system that captures a field of view from the location of the autonomous vehicle 306. When the autonomous vehicle 306 identifies an inconsistency with currently stored map data, the inconsistency is communicated to a data store 304 of a computing system 302 (e.g., the data store 112 of the computing system 100) as a newly specified avoidance area data 312 (e.g., the avoidance area data 104). The avoidance area data 312 specifies an avoidance area 310 through which the autonomous vehicle 306 can no longer be routed until the avoidance area 310 is remapped and updated in the data store 304.

An avoidance area 310 can be either blacklisted or greylisted by the computing system 302 based upon the complexity of the inconsistency detected by the sensor system 308 and corresponds to either an addressable or non-addressable avoidance area. An addressable avoidance areas can include, but is not limited to, an area that needs further data collection, causes incorrect vehicle maneuvers, includes new or uncommon features, causes localization or mapping errors, is prone to heavy traffic, or requires further verification, whereas a non-addressable avoidance area can include, but is not limited to, an area having narrow or reversable lanes, long-term construction, complex intersections such as roundabouts, combined lights and signage, railways, etc. Non-addressable avoidance areas specify a geographic area through which generation of the initial route and the one or more alternative routes is prohibited (e.g., as if the portion of the roadway including the non-addressable avoidance area is impassable or does not exist).

Figure 4:
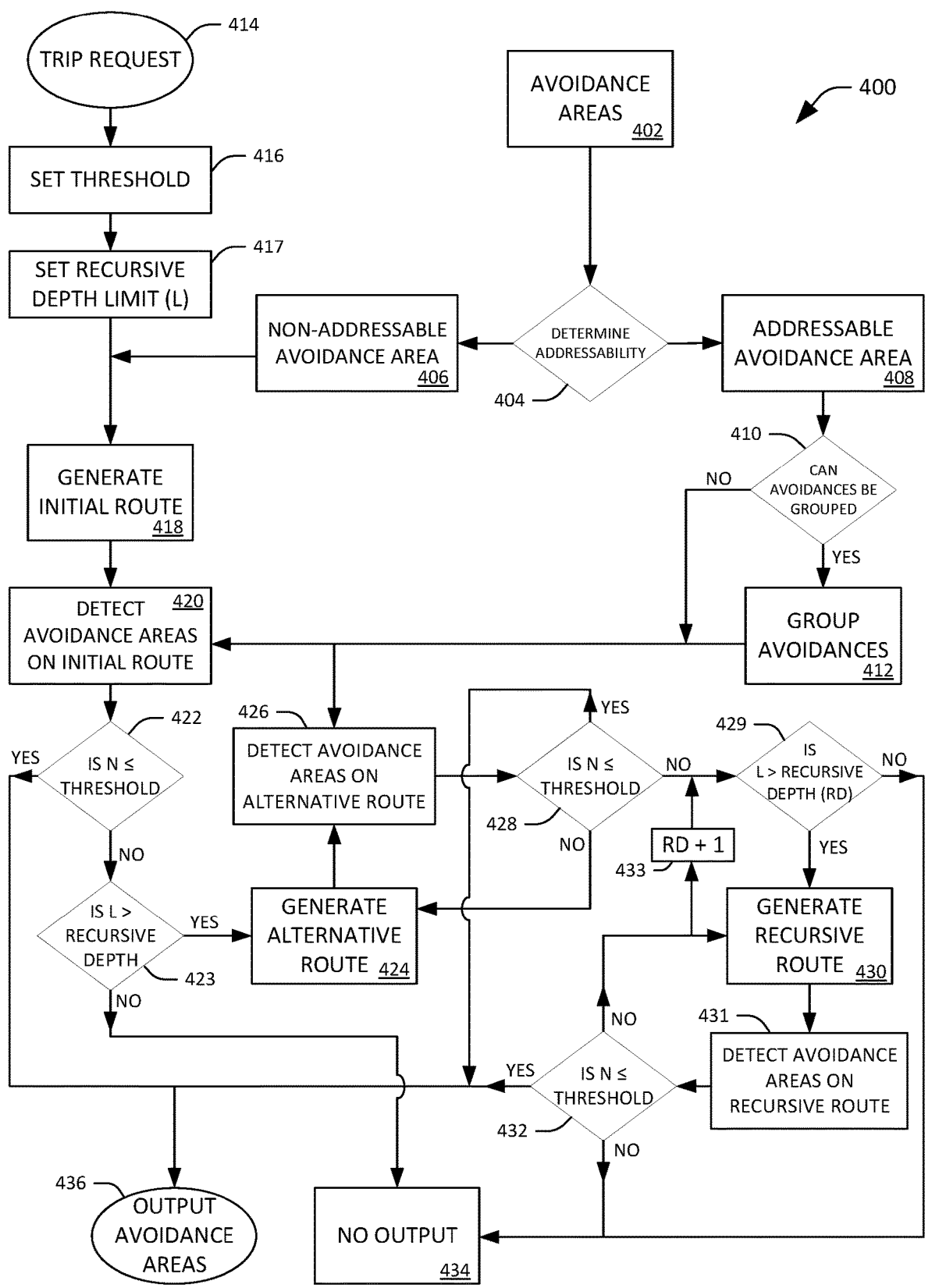
FIG. 4 illustrates an exemplary process for determining avoidance areas to desirably remove from a set of avoidance areas.

With reference now to FIG. 4, flow diagram 400 illustrates an exemplary process for determining avoidance areas to desirably be removed from a set of avoidance areas maintained in a data store and/or included on a map. Steps 402-412 define a configuration of one or more avoidance areas. The output configuration then provides a basis for the routing and analysis process performed at 414-436.

Avoidance areas 402 can be identified based upon detected discrepancies within a mapped environment. At 404, the addressability of the avoidance areas 402 is determined. Non-addressable avoidance areas 406 can include, but are not limited to, dim traffic lights, gates and private roads, certain bridge/tunnel/overpass configurations, poor road conditions, all-way yields, sharp turns/U-turns, etc. Non-addressable avoidance areas 406 cannot be desirably removed from the set of avoidance areas and are therefore avoided (e.g., during steps 418, 424, and 430) when a route is generated.

For example, addressable avoidance areas 408 can be geographic areas that include short-term construction, undefined light types, temporary road closures, vegetation, segmentation errors, etc. At 410, characteristics of identified avoidances are evaluated to determine whether the avoidances should be grouped together as a single addressable avoidance area 408. If the avoidances include such characteristics, the avoidances are grouped at 412 and provided for an avoidance area detection step (420, 426). Otherwise, the addressable avoidance areas 408 are provided directly to the avoidance area detection steps (420, 426) on an individual basis.

Routing and analysis can be initiated by a trip request 414 for which a set threshold 416 defines a number of avoidance areas to desirably be removed from the set of avoidance areas and a set recursive depth limit 417 defines a level of recursion. The set threshold 416 can be set at any threshold number of avoidance areas to desirably remove from a route generated according to the trip request 414. The set recursive depth limit 417 can likewise be set at any desirable recursive depth limit (L). For example, a recursive depth limit of one would include only the initial route, a recursive depth limit of two would include the initial route as well as one or more alternative routes generated from the initial route, and a recursive depth limit of three or more would include the initial route, the one or more alternative routes generated from the initial route, as well as one or more recursive routes generated from the one or more alternative routes and/or routes of preceding lower levels of recursion (e.g., a recursive route having a depth parameter of 4 may be generated off of a preceding lower level recursive route having a depth parameter of 3 which, in turn, may be generated off of an alternative route having a depth parameter of 2, which is further generated off of the initial route having a depth parameter of 1).

At 418, an initial route is generated from a source location to a target location. While the initial route is generated to avoid the non-addressable avoidance areas identified at 406, the addressable avoidance areas identified at 408 are ignored by the routing system during generation of the initial route. At 420, addressable avoidance areas 408 on the initial route are detected. At 422, if the number of avoidance areas detected on the initial route is less than or equal to the set threshold 416, the avoidance areas on the initial route are output at 436 as avoidance areas that can desirably be removed from the set of avoidance areas. If the number of avoidance areas detected on the initial route is greater than the set threshold 416, it is determined at 423 whether the set recursive depth limit 417 is greater than the recursive depth of the initial route (i.e., one). If so, one or more alternative routes are generated at 424 from the source location to the target location that respectively ignore all addressable avoidance areas 408, except for an individual corresponding avoidance area on the initial route. Otherwise, no output is generated at 434 because the number of avoidance areas on the initial route exceeds the set threshold 416 and the set recursive depth limit 417 prevents generation of one or more routes having a higher level of recursion.

At 426, addressable avoidance areas 408 on the one or more alternative routes are detected for each of the one or more alternative routes. At 428, if the number of avoidance areas detected on a given one of the one or more alternative routes is less than or equal to the set threshold 416, the avoidance areas on the given one of the one or more alternative routes are output at 436 as avoidance areas that can desirably be removed from the set of avoidance areas. If the number of avoidance areas detected on the given one of the one or more alternative routes is greater than the set threshold 416, another alternative route can be generated at 424 by generating another given one of the one or more alternative routes to respectively ignore a next corresponding avoidance area on the initial. This process may be repeated until there is no remaining next corresponding avoidance area on the initial route. Additionally or alternatively, it can be determined at 429 whether the set recursive depth limit 417 is greater than the recursive depth of the one or more alternative routes (i.e., two). If so, one or more recursive routes having a recursive depth of three, for example, can be generated at 430 from the source location to the target location that respectively ignore all addressable avoidance areas 408, except for an individual corresponding avoidance area on a route having a preceding level of recursion, such as a given one of the one or more alternative routes. Otherwise, no output is generated at 434 because the number of avoidance areas on the one or more alternative routes exceeds the set threshold 416 and the set recursive depth limit 417 prevents generation of one or more routes having a higher level of recursion (e.g., three or greater).

At 431, the addressable avoidance areas 408 are detected for each of the one or more recursive routes which, for example, may have a recursive depth of three. At 432, if the number of avoidance areas detected on a given one of the one or more recursive routes is less than or equal to the set threshold 416, the avoidance areas on the given one of the one or more recursive routes are output at 436 as avoidance areas that can desirably be removed from the set of avoidance areas. If the number of avoidance areas detected on the given one of the one or more recursive routes is greater than the set threshold 416, another recursive route can be generated at 430 having the same level of recursive depth (e.g., three) by generating another given one of the one or more recursive routes to respectively ignore a next corresponding avoidance area on a route having a preceding level of recursion, such as a given one of the one or more alternative routes. This process may be repeated until there is no remaining next corresponding avoidance area on the routes having a preceding level of recursion. Additionally or alternatively, the recursive depth (RD) may be increased to RD+1 at 433, from which it is determined at 429 whether the set recursive depth limit 417 is greater than RD+1. If the recursive depth limit 417 is not greater than RD+1, no output is generated at 434 because the number of avoidance areas on each of the one or more recursive routes having a recursive depth of RD exceeds the set threshold 416 and the set recursive depth limit 417 prevents generation of one or more routes having a higher level of recursion. Otherwise, the cycle represented by steps 429-433 is repeated to identify a number of avoidance areas at 432 on a given one of one or more further recursive routes that is less than or equal to the set threshold 416 and/or provides no output at 434 because the number of avoidance areas identified at 432 for the given one of the one or more further recursive routes is greater than the set threshold 416. Each subset of avoidance areas comprising the identified avoidance areas on a given route (e.g., initial route, alternative route recursive route, etc.) that can desirably be removed from the set of avoidance areas may be selected for removal. Alternatively, subsets of the avoidance areas may be selected for removal from the set of avoidance areas based upon metrics such as length of route, estimated time of arrival, routing costs, etc.

Figure 5:
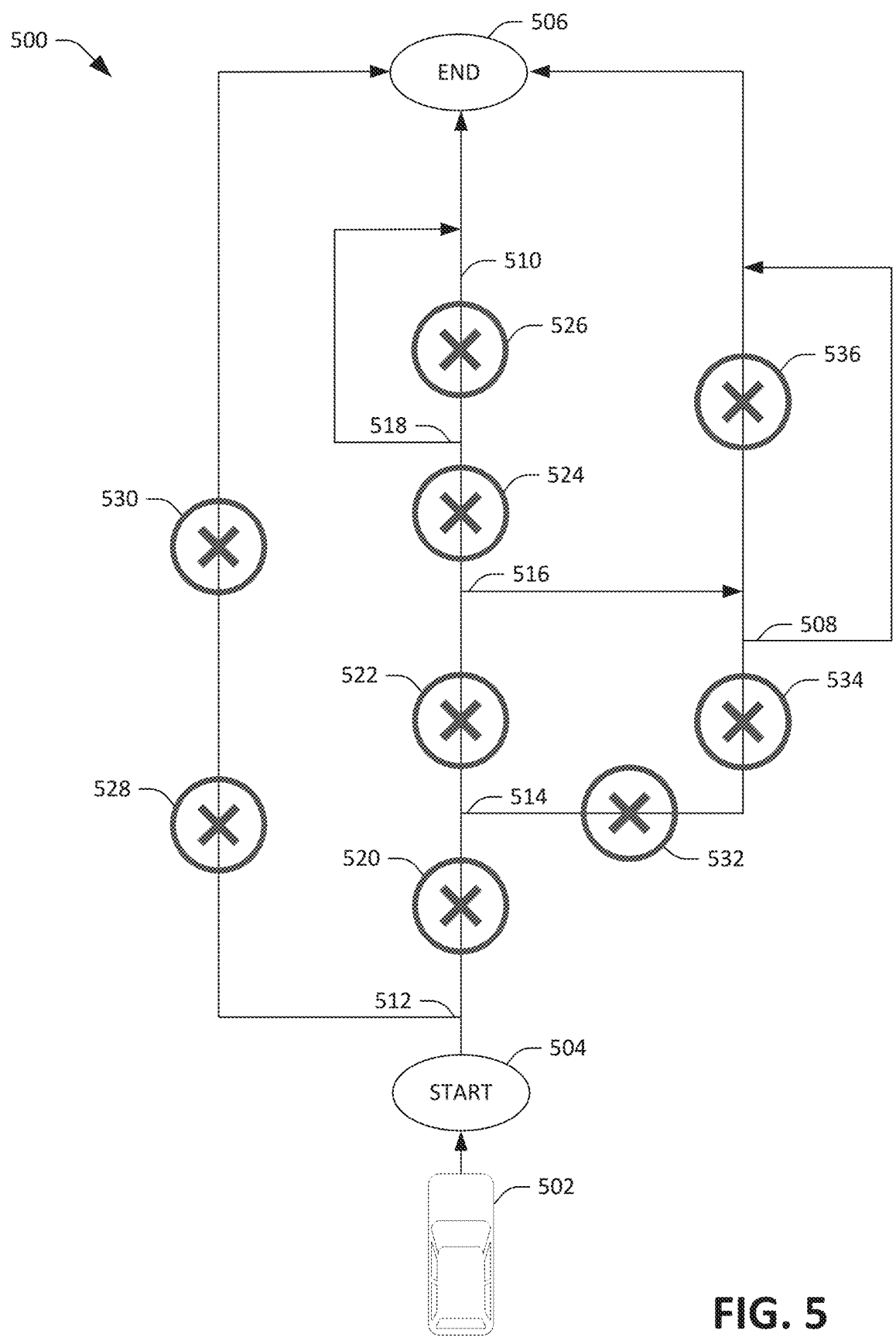
FIG. 5 illustrates alternative routes from a source location to a target location.

With reference now to FIG. 5, routing diagram 500 illustrates alternative routes 512-518 that are generated from a source location 504 to a target location 506 when a number of avoidance areas on an initial route 510 exceeds a predetermined threshold. However, an initial route 510 is first generated that ignores all addressable avoidance areas 520-536. In routing diagram 500, the initial route 510 passes through four avoidance areas (520, 522, 524, 526). If the predetermined threshold is set at N≤4, the routing system does not generate an alternative route because removing/resolving the four avoidance areas 520-526 on the initial route 510 would satisfy the criteria established by the predetermined threshold. Alternatively, if the predetermined threshold is set at N≤3, removing only three of the four avoidance areas 520-526 on the initial route 510 would not provide an autonomous vehicle 502 with access to the target location 506 along the initial route 510 because one of the four avoidance areas 520-526 on the initial route 510 would remain unresolved.

Accordingly, one or more alternative routes 512-518 are generated that respectively circumvent a corresponding avoidance area (520, 522, 524, 526) on the initial route 510 when the number of avoidance areas on an initial route 510 exceeds the predetermined threshold. That is, a first alternative route 512 is generated that ignores all avoidance areas except the first avoidance area 520 on the initial route 510; a second alternative route 514 is generated that ignores all avoidance areas except the second avoidance area 522 on the initial route 510; a third alternative route 516 is generated that ignores all avoidance areas except the third avoidance area 524 on the initial route 510; and a fourth alternative route 518 is generated that ignores all avoidance areas except the fourth avoidance area 526 on the initial route 510.

Additional avoidance areas 528-536 disposed on the one or more alternative routes 512-518, as well as any of the avoidance areas 520-526 that were temporarily ignored to generate the alternative routes 512-518, are identified following generation of the one or more alternative routes 512-518. In routing diagram 500, the first alternative route 512 includes two avoidance areas 528-530, the second alternative route 514 includes four avoidance areas (520, 532, 534, 536), the third alternative route 516 includes three avoidance areas (520, 522, 536), and the fourth alternative route 518 also includes three avoidance areas (520, 522, 524). When an alternative route passes through N or less avoidance areas, the route is identified as a candidate route from which avoidance areas to desirably be removed from the set of avoidance areas may be outputted. Thus, avoidance areas (520, 532, 534, 536) on the second alternative route 514 are excluded from a potential output, with respect to clearing the second alternative route 514, because the second alternative route 514 has more than N avoidance areas. On the contrary, since the first alternative route 512 includes the least amount of avoidance areas to remove, resolution of the avoidance areas 528-530 on the first alternative route 512 may be prioritized over the avoidance areas (520, 522, 536) on the third alternative route 516 and the avoidance areas (520, 522, 524) or the fourth alternative route 518.

If none of the initial route 510 or the one or more alternative routes 512-518 pass through N or less avoidance areas, a recursive route 508 may be generated off of the one or more alternative routes 512-518 according to a process that is similar to generating the one or more alternative routes 512-518 off of the initial route 510. In particular, one or more recursive routes can respectively circumvent a corresponding identified avoidance area included on the one or more alternative routes 512-518. This process can be repeated for recursive routes have further levels of recursion by respectively circumventing a corresponding identified avoidance area included on one or more recursive routes of a preceding recursive level.

In routing diagram 500 the second alternative route 514 includes four avoidance areas (520, 532, 534, 536). Thus, an exemplary recursive route 508 having three avoidance areas (520, 532, 534) is generated off of the second alternative route 514 that satisfies the predetermined threshold of N≤3. The one or more alternative/recursive routes may be generated based upon a recursive depth parameter that limits a level of recursive routes. For example, the initial route 510 would have a recursive depth parameter of 1, the one or more alternative routes 512-518 would have a recursive depth parameter of 2, the one or more recursive routes 508 would have a depth parameter of 3, and so on.

Figure 6:
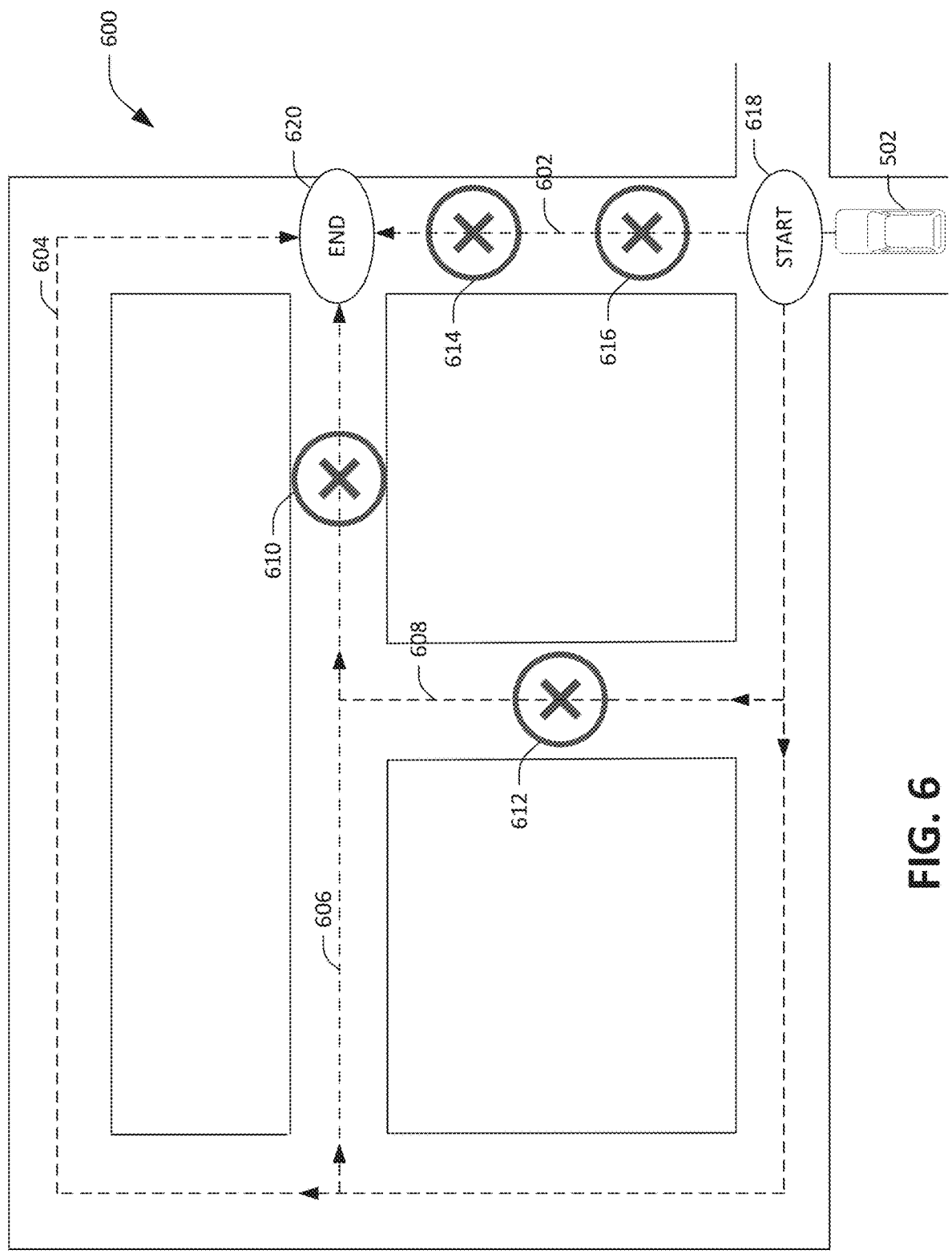
FIG. 6 illustrates the network effects on routing caused by consecutive and concurrent removal of avoidance areas.

With reference now to FIG. 6, map configuration 600 illustrates the network effects on routing caused by removing avoidance areas consecutively, as opposed to manipulating the predetermined threshold to concurrently remove a same number of avoidance areas. In map configuration 600, if avoidance areas 610-616 were not present, initial route 602 would be the ideal route for the autonomous vehicle 502 to travel from the source location 618 to the target location 620. However, since the avoidance areas 610-616 identify a geographic area through which the autonomous vehicle 502 is prohibited from being routed, first route 604 is identified as the most practical route for the autonomous vehicle 502 to travel.

If the predetermined threshold is set such that only one avoidance area 610-616 can be removed at a time, avoidance area 610 may be selected first. Removing avoidance area 610 would then result in manipulating the travel route of the autonomous vehicle 502 due to second route 606 becoming the new most practical route for the autonomous vehicle 502 to travel. By maintaining removal of only one avoidance area at a time, avoidance area 612 may be the next avoidance area selected for removal. Removing avoidance area 612 would again result in manipulating the travel route of the autonomous vehicle 502 due to third route 608 becoming the next most practical route for the autonomous vehicle 502 to travel.

Accordingly, two avoidance areas 610 and 612 were removed consecutively by detecting a first avoidance area 610 to remove, determining that second route 606 is the new most practical route, and subsequently detecting a second avoidance area 612 to remove based upon the second route 606 being the new most practical route. While consecutive removal of avoidance areas 610-612 can be advantageous in some circumstances due to continuous improvement upon the efficiencies of the most practical route available for the autonomous vehicle 502, consecutive removal of avoidance areas may not always provide the best overall approach to avoidance area removal. For example, if the predetermined threshold had been set at $N \leq 2$, avoidance areas 614 and 616 would have been selected for concurrent removal to provide the autonomous vehicle 502 with access to the ideal/initial route 602. Instead, two avoidance areas 610 and 612 may have required the same amount of work to remove but only provided the autonomous vehicle 502 with access to the third route 608, which may be less desirable than initial route 602.

Figure 7:
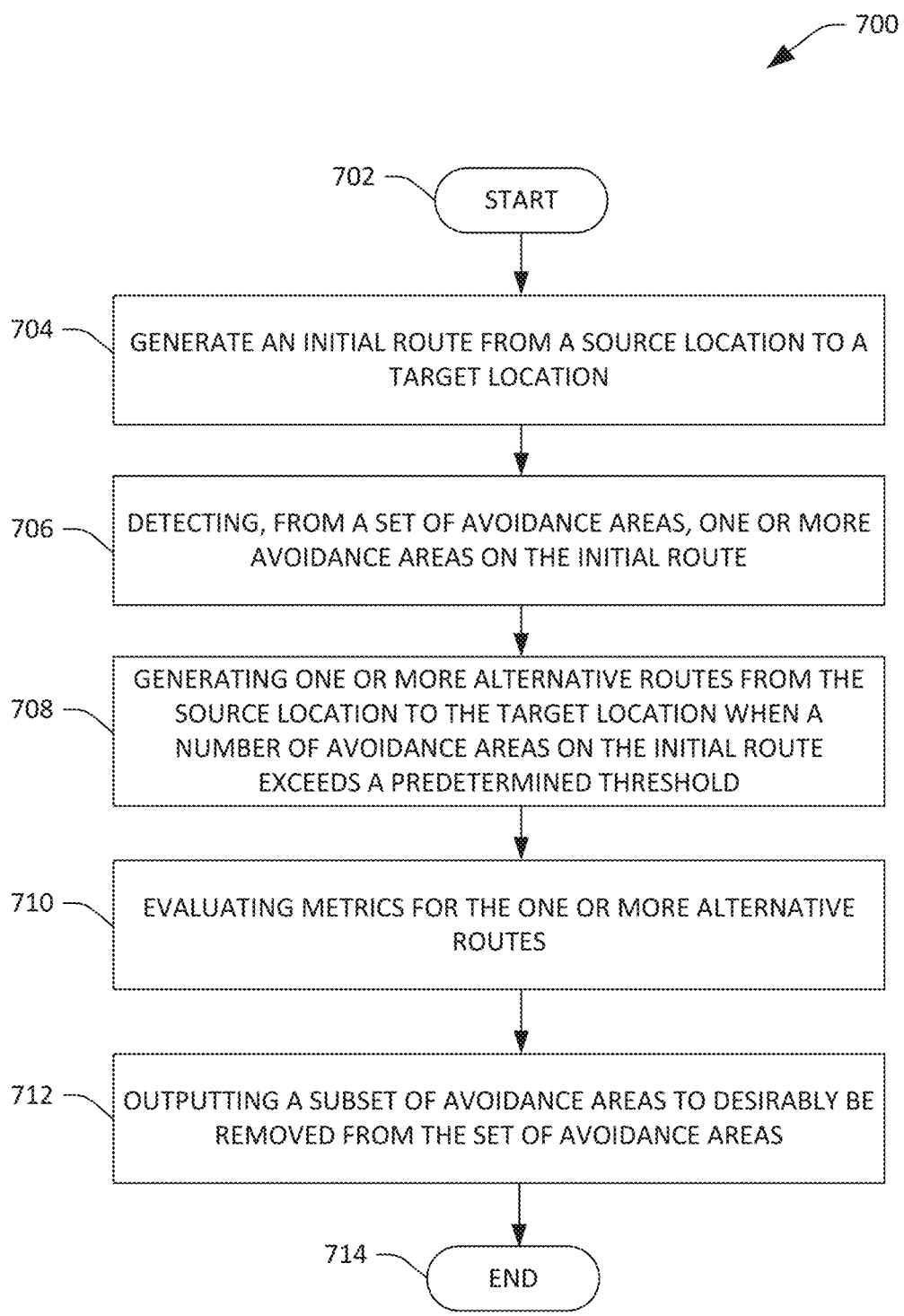
FIG. 7 is a flow diagram illustrating an exemplary methodology for outputting a subset of avoidance areas to desirably be removed from an alternative route that is generated from a source location to a target location.
Figure 8:
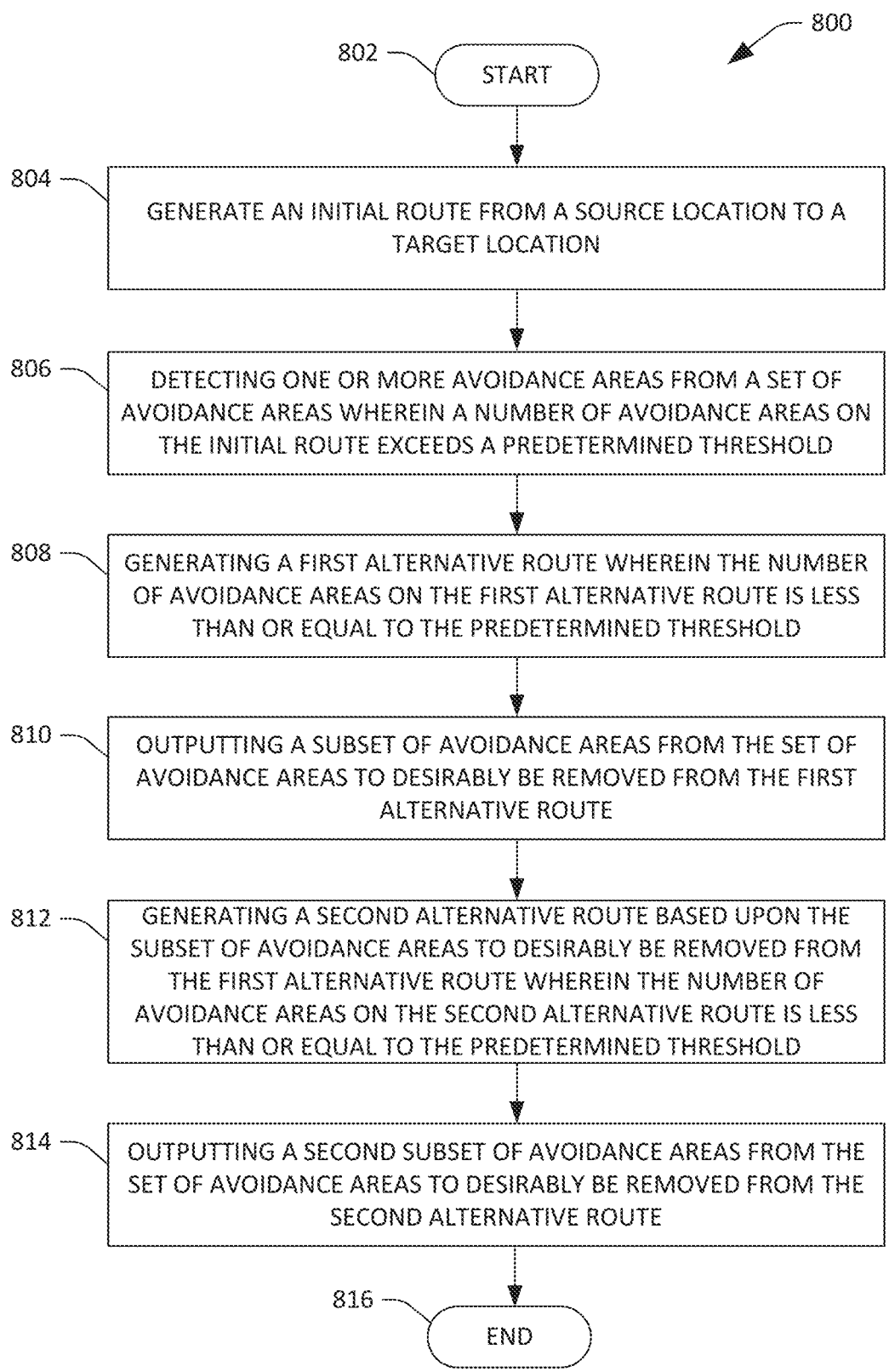
FIG. 8 is a flow diagram illustrating an exemplary methodology for outputting subsets of avoidance areas to desirably be removed by consecutively generating and removing alternative routes and avoidance areas.

FIGS. 7 and 8 illustrate exemplary methodologies for analyzing network effects of avoidance areas on routing. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, an exemplary methodology 700 for analyzing network effects of avoidance areas on routing is illustrated. The methodology 700 starts at 702, and at 704, an initial route is generated from a source location to a target location. The initial route can be generated irrespective of avoidance areas that may be otherwise disposed along the initial route. An avoidance area specifies a geographic area through which an autonomous vehicle is prohibited from being routed. At 706, one or more identified avoidance areas from a set of avoidance areas are detected on the initial route.

At 708, one or more alternative routes are generated from the source location to the target location when a number of avoidance areas on the initial route exceed a predetermined threshold. For example, if N=3 and the initial route includes four or more avoidance areas, one or more alternative routes from the source location to the target location are generated. Otherwise, the three or less avoidance areas disposed on the initial route may be output from the subset of avoidance areas to desirably be removed from the set of avoidance areas. The one or more alternative routes respectively circumvent a corresponding identified avoidance area included in the one or more identified avoidance areas on the initial route.

At 710, metrics are evaluated for the one or more alternative routes. The metrics can include a heuristic that is based upon the cost of a route, the length of a route, routing costs, etc. At 712, a subset of avoidance areas from the set of avoidance areas is output based upon the metrics for the one or more alternative routes. The avoidance areas in the subset are on one or more of the initial route or the one or more alternative routes, such that the subset of avoidance areas are outputted to desirably be removed from the set of avoidance areas. The methodology 700 completes at 714.

Referring now to FIG. 8, an exemplary methodology 800 for analyzing network effects of avoidance areas on routing is illustrated. The methodology 800 starts at 802, for example, in view of a set of avoidance areas that specify a geographic area through which an autonomous vehicle is prohibited from being routed. At 804, an initial route is generated from a source location to a target location. The configuration of the initial route is generated irrespective of avoidance areas that may be otherwise disposed along the initial route. At 806, one or more avoidance areas are detected from the set of the avoidance areas, wherein a number of avoidance areas on the initial route exceeds a predetermined threshold.

At 808, a first alternative route is generated from the source location to the target location in which the number of avoidance areas on the first alternative route is less than or equal to the predetermined threshold. The first alternative route is configured to circumvent a corresponding identified avoidance area on the initial route. At 810, a subset of the avoidance areas is output from the set of avoidance to desirably be removed from the first alternative route.

At 812, a second alternative route is generated from the source location to the target location based upon the subset of avoidance areas to desirably be removed from the first alternative route. In particular, when the subset of avoidance areas output for the first alternative route is removed, a new initial route is generated that serves as the basis for generating the second alternative route. The new initial route includes a number of avoidance areas that exceeds the predetermined threshold and the second alternative route includes a number of avoidance areas that is less than or equal to the predetermined threshold. At 814, a second subset of avoidance areas is output from the set of avoidance areas to desirably be removed from the second alternative route. The method 800 completes at 816. However, the steps of generating a route and outputting a subset of avoidance areas to desirably be removed can be performed recursively to output a third subset of avoidance areas and so on until desirable criteria are satisfied.

Figure 9:
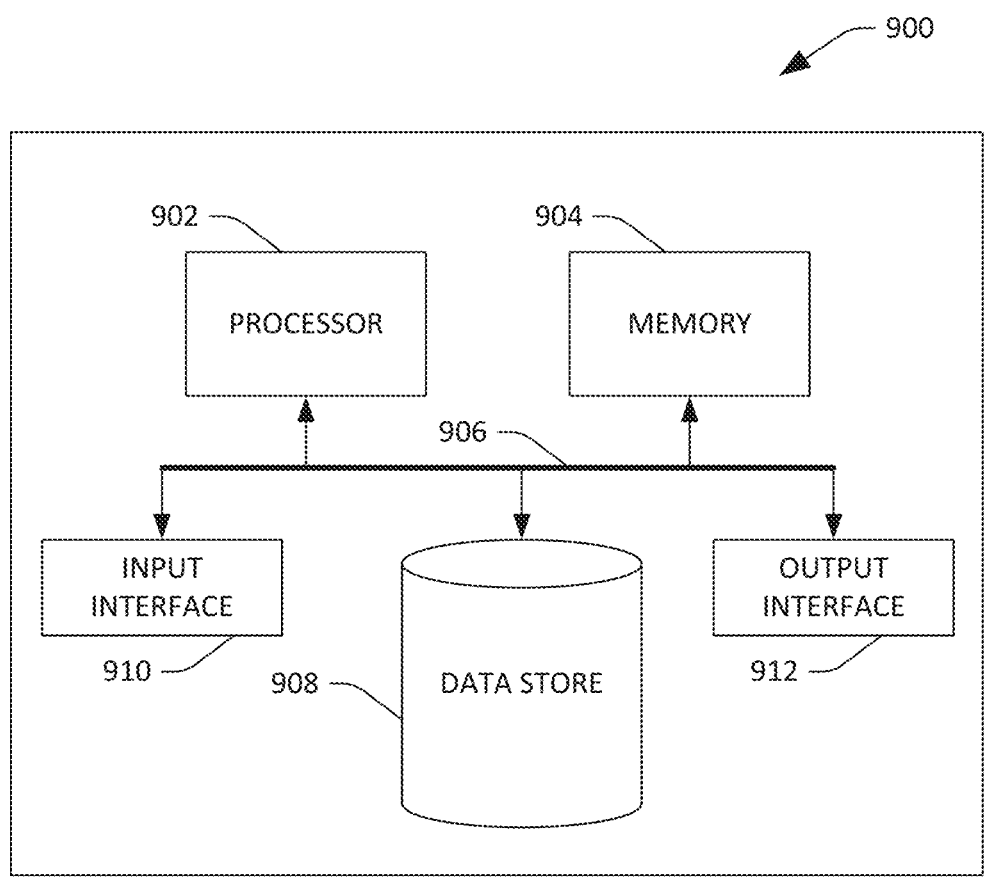
FIG. 9 illustrates an exemplary computing system.

Referring now to FIG. 9, a high-level illustration of an exemplary computing device 900 that can be used in accordance with the systems and methodologies disclosed herein is illustrated. For instance, the computing device 900 may be or include the computing system 100. The computing device 900 includes at least one processor 902 that executes instructions that are stored in a memory 904. The instructions may be, for instance, instructions for implementing functionality described as being carried out by one or more modules and systems discussed above or instructions for implementing one or more of the methods described above. In addition to storing executable instructions, the memory 904 may also store location information, distance information, direction information, etc.

The computing device 900 additionally includes a data store 908 that is accessible by the processor 902 by way of the system bus 906. The data store 908 may include executable instructions, location information, distance information, direction information, etc. The computing device 900 also includes an input interface 910 that allows external devices to communicate with the computing device 900. For instance, the input interface 910 may be used to receive instructions from an external computer device, etc. The computing device 900 also includes an output interface 912 that interfaces the computing device 900 with one or more external devices. For example, the computing device 900 may transmit control signals to the computing system 100 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
   a data store, the data store comprises a set of avoidance areas, wherein an avoidance area specifies a geographic area through which autonomous vehicles are prohibited from being routed;
   at least one processor; and
   memory that stores computer-executable instructions that, when executed by the at least one processor, cause the at least one processor to perform acts comprising:
      generating an initial route from a source location to a target location;
      detecting one or more identified avoidance areas from the set of the avoidance areas on the initial route;
      causing the one or more identified avoidance areas on the initial route to be remapped when a number of the one or more identified avoidance areas on the initial route is less than or equal to a predetermined threshold, wherein the one or more identified avoidance areas on the initial route are desirably removed from the set of avoidance areas when remapped; and
      when the number of the one or more identified avoidance areas on the initial route exceeds the predetermined threshold;
         generating one or more alternative routes from the source location to the target location, wherein the one or more alternative routes respectively circumvent a corresponding identified avoidance area included in the one or more identified avoidance areas on the initial route;
         evaluating metrics for the one or more alternative routes; and
         causing a subset of the avoidance areas from the set of avoidance areas to be remapped based on the metrics for the one or more alternative routes, wherein the avoidance areas in the subset are on at least one of the one or more alternative routes, and wherein the subset of the avoidance areas are desirably removed from the set of avoidance areas when remapped.

2. The computing system of claim 1, wherein the acts performed by the at least one processor further comprises:
   detecting the one or more identified avoidance areas from the set of the avoidance areas on the one or more alternative routes;
   generating one or more recursive routes from the source location to the target location when the number of the one or more identified avoidance areas on the initial route and each of the one or more alternative routes exceeds the predetermined threshold, wherein the one or more recursive routes respectively circumvent the corresponding identified avoidance area included in the one or more identified avoidance areas on the one or more alternative routes;
   evaluating metrics for the one or more recursive routes; and
   causing the subset of the avoidance areas from the set of avoidance areas to be remapped based on the metrics for the one or more recursive routes, wherein the avoidance areas in the subset are on at least one of the one or more recursive routes, and wherein the subset of the avoidance areas are desirably removed from the set of avoidance areas when remapped.

3. The computing system of claim 1, wherein the one or more alternative routes is generated based upon a recursive depth parameter that limits a level of recursive routes generated from the one or more alternative routes.

4. The computing system of claim 1, wherein the data store further comprises a non-addressable avoidance area which specifies a geographic area through which generation of the initial route and the one or more alternative routes is prohibited.

5. The computing system of claim 1, wherein at least one of the avoidance areas in the set of avoidance areas is defined by grouping a plurality of avoidances into a common group.

6. The computing system of claim 1, wherein the metrics used to evaluate the one or more alternative routes includes a heuristic.

7. The computing system of claim 1, wherein the acts performed by the at least one processor further comprises:
   identifying the avoidance areas in the subset that when removed from the set of avoidance areas provide a less desirable value of a metric than the value of the metric provided by removal of other avoidance areas in the subset; and
   excluding the avoidance areas in the subset that provide the less desirable value of the metric from being caused to be remapped.

8. The computing system of claim 1, wherein the one or more alternative routes is generated based upon a predefined processing time constraint which specifies a timeframe for the at least one processor to generate the one or more alternative routes.

9. A method for identifying an avoidance area to remove from a set of avoidance areas, the method comprising:
   generating an initial route from a source location to a target location;
   detecting one or more identified avoidance areas from the set of the avoidance areas on the initial route, wherein an avoidance area specifies a geographic area through which autonomous vehicles are prohibited from being routed;
   causing the one or more identified avoidance areas on the initial route to be remapped when a number of the one or more identified avoidance areas on the initial route is less than or equal to a predetermined threshold, wherein the one or more identified avoidance areas on the initial route are desirably removed from the set of avoidance areas when remapped; and
   when the number of the one of more identified avoidance areas on the initial route exceeds the predetermined threshold;
   generating one or more alternative routes from the source location to the target location wherein the one or more alternative routes respectively circumvent a corresponding identified avoidance area included in the one or more identified avoidance areas on the initial route;
   evaluating metrics for the one or more alternative routes; and
   causing a subset of the avoidance areas from the set of avoidance areas to be remapped based on the metrics for the one or more alternative routes, wherein the avoidance areas in the subset are on at least one of the one or more alternative routes, and wherein the subset of the avoidance areas are desirably removed from the set of avoidance areas when remapped.

10. The method of claim 9, further comprising:
    detecting the one or more identified avoidance areas from the set of the avoidance areas on the one or more alternative routes;
    generating one or more recursive routes from the source location to the target location when the number of the one or more identified avoidance areas on the initial route and each of the one or more alternative routes exceeds the predetermined threshold, wherein the one or more recursive routes respectively circumvent the corresponding identified avoidance area included in the one or more identified avoidance areas on the one or more alternative routes;
    evaluating metrics for the one or more recursive routes; and
    causing the subset of the avoidance areas from the set of avoidance areas to be remapped based on the metrics for the one or more recursive routes, wherein the avoidance areas in the subset are on at least one of the one or more recursive routes, and wherein the subset of the avoidance areas are desirably removed from the set of avoidance areas when remapped.

11. The method of claim 9, further comprising generating the one or more alternative routes based upon a recursive depth parameter that limits a level of recursive routes generated from the one or more alternative routes.

12. The method of claim 9, further comprising generating the initial route and the one or more alternative routes to avoid non-addressable avoidance areas, wherein a non-addressable avoidance area specifies a geographic area through which generation of the initial route and the one or more alternative routes is prohibited.

13. The method of claim 9, further comprising defining at least one of the avoidance areas in the set of avoidance areas by grouping a plurality of avoidances that form a common group.

14. The method of claim 9, further comprising executing a heuristic to evaluate the metrics for the one or more alternative routes.

15. The method of claim 9, further comprising
    identifying the avoidance areas in the subset that when removed from the set of avoidance areas provide a less desirable value of a metric than the value of the metric provided by removal of other avoidance areas in the subset; and excluding the avoidance areas in the subset that provide the less desirable value of the metric from being caused to be remapped.

16. The method of claim 9, further comprising generating the one or more alternative routes based upon a predefined processing time constraint which specifies a timeframe for the at least one processor to generate the one or more alternative routes.

17. A computing system, comprising:
a data store, the data store comprises a set of avoidance areas, wherein an avoidance area specifies a geographic area through which autonomous vehicles are prohibited from being routed;
at least one processor; and
memory that stores computer-executable instructions that, when executed by the at least one processor, cause the at least one processor to perform acts comprising:
generating an initial route from a source location to a target location;
detecting avoidance areas from the set of the avoidance areas on the initial route, wherein a number of the avoidance areas on the initial route exceeds a predetermined threshold;
generating a first alternative route from the source location to the target location, wherein the first alternative route circumvents one of the avoidance areas on the initial route, and wherein a number of avoidance areas on the first alternative route is less than or equal to the predetermined threshold;
generating a second alternative route from the source location to the target location, wherein the second alternative route circumvents a differing one of the avoidance areas on the initial route, and wherein a number of avoidance areas on the second alternative route is less than or equal to the predetermined threshold;
determining whether to desirably remove the avoidance areas on the first alternative route or the avoidance areas on the second alternative route from the set of avoidance areas; and
causing one of the avoidance areas on the first alternative route or the avoidance areas on the second alternative route to be remapped such that a subset of the avoidance areas are desirably removed from the set of avoidance areas.

18. The computing system of claim 17, wherein at least one of the avoidance areas in the set of avoidance areas is defined by grouping a plurality of avoidances into a common group.

19. The computing system of claim 17, wherein the acts performed by the at least one processor further comprises:
causing the avoidance areas on the initial route to be remapped when the number of the avoidance areas on the initial route is less than or equal to a predetermined threshold, wherein the avoidance areas on the initial route are desirably removed from the set of avoidance areas when remapped.

20. The computing system of claim 17, wherein the data store further comprises a non-addressable avoidance area which specifies a geographic area through which generation of the initial route, the first alternative route, and the second alternative route is prohibited.

* * * * *